US012595075B2

(12) United States Patent
Anderson et al.

(10) Patent No.: US 12,595,075 B2
(45) Date of Patent: Apr. 7, 2026

(54) CONTROLLER AREA NETWORK DISTRIBUTION SYSTEM FOR AIRCRAFT

(71) Applicant: Textron eAviation Inc., Providence, RI (US)

(72) Inventors: Rolf Anderson, Wichita, KS (US); Alec Mitchell, Wichita, KS (US); Amelie Lemoine, Montreal (CA); William Valentine, Bel Aire, KS (US); Steven G. Hagerott, Wichita, KS (US)

(73) Assignee: Textron eAviation Inc., Providence, RI (US)

( * ) Notice: Subject to any disclaimer, the term of this patent is extended or adjusted under 35 U.S.C. 154(b) by 126 days.

(21) Appl. No.: 18/768,759

(22) Filed: Jul. 10, 2024

(65) Prior Publication Data

US 2025/0019092 A1 Jan. 16, 2025

Related U.S. Application Data

(60) Provisional application No. 63/512,685, filed on Jul. 10, 2023.

(51) Int. Cl.
B64D 47/00 (2006.01)
H02K 1/22 (2006.01)

(52) U.S. Cl.
CPC ............... B64D 47/00 (2013.01); H02K 1/22 (2013.01); B64D 2221/00 (2013.01)

(58) Field of Classification Search
CPC .................................................... B64D 47/00
See application file for complete search history.

(56) References Cited

U.S. PATENT DOCUMENTS

| | | | |
|---|---|---|---|
| 7,439,634 B2 | 10/2008 | Michalko | |
| 7,550,866 B2 | 6/2009 | Breit et al. | |
| 7,800,245 B2 | 9/2010 | Michalko | |
| 10,079,493 B2 | 9/2018 | Winstanley et al. | |
| 10,396,565 B2 | 8/2019 | Bailey et al. | |
| 11,097,834 B2 | 8/2021 | Wilkens | |
| 11,273,906 B2 | 3/2022 | Keir | |

(Continued)

FOREIGN PATENT DOCUMENTS

| | | | | | |
|---|---|---|---|---|---|
| EP | 3254960 A1 | * | 12/2017 | ............... | B64C 9/22 |
| EP | 4029778 A1 | * | 7/2022 | ............. | B64D 45/00 |

(Continued)

*Primary Examiner* — Christopher P Ellis
(74) *Attorney, Agent, or Firm* — Avek IP, LLC

(57) ABSTRACT

A controller area network (CAN) distribution system for an aircraft includes flight control computers (FCCS) for operation of the aircraft; a first bus bundle is in communication with the FCCs, and directs communication from the FCCs to a left front rotor assembly and a right rear rotor assembly; a second bus bundle in communication with the FCCs, the second bus bundle directs communication from the FCCs to a right front rotor assembly and a left rear rotor assembly; and a third bus bundle in communication with the FCCs, the third bus bundle directs communication from the FCCs to a left wing tip rotor assembly and a right wing tip rotor assembly; the first bus bundle, the second bus bundle, and the third bus bundle are to balance bandwidth, optimize total bus length and width, and provide adequate control after a failure of any two busses.

20 Claims, 9 Drawing Sheets

(56) References Cited

U.S. PATENT DOCUMENTS

| | | | | |
|---|---|---|---|---|
| 2016/0094039 A1* | 3/2016 | Winstanley | ............... | H02J 4/00 |
| | | | | 318/504 |
| 2025/0019092 A1* | 1/2025 | Anderson | ................ | H02K 1/22 |
| 2025/0376075 A1* | 12/2025 | Aymon-Demont | ..... | B60L 58/18 |

FOREIGN PATENT DOCUMENTS

| | | | | | |
|---|---|---|---|---|---|
| GB | 2547946 | A | * 9/2017 | ........... | H05K 7/1457 |
| WO | WO-2010052338 | A1 | * 5/2010 | ............. | H02P 9/007 |
| WO | 2019232472 | A1 | 12/2019 | | |

* cited by examiner

| Controller ID | Effector | Actuator/Motor Type | FCC 1,3 | | | FCC 1,2 | | | FCC 2,3 | | |
|---|---|---|---|---|---|---|---|---|---|---|---|
| | | | A1 | A2 | A3 | B1 | B2 | B3 | C1 | C2 | C3 |
| RC1A | Ruddervator 1 | Single Motor Rotary | | X | | X | | | | | |
| RC2A | Ruddervator 2 | Single Motor Rotary | | | | X | | | | X | |
| RC3A | Ruddervator 3 | Single Motor Rotary | | | | | X | | X | | |
| RC4A | Ruddervator 4 | Single Motor Rotary | X | | | | X | | | | |
| FC1A | Flaperon 1 | Single Motor Rotary | | X | | | | X | | | |
| FC2A | Flaperon 2 | Single Motor Rotary | | X | | | | X | | | |
| FC3A | Flaperon 3 | Single Motor Rotary | X | | | | | | | | X |
| FC4A | Flaperon 4 | Single Motor Rotary | X | | | | | X | | | |
| CBP1A | Collective 1 | Single Motor Rotary | | | | | | X | X | | |
| CBP2A | Collective 2 | Single Motor Rotary | X | | | | X | | | | |
| CBP3A | Collective 3 | Single Motor Rotary | | X | | | X | | | | |
| CBP4A | Collective 4 | Single Motor Rotary | | | X | | | | | | X |
| CBP5A | Collective 5 | Single Motor Rotary | | X | | | | | | X | |
| CBP6A | Collective 6 | Single Motor Rotary | X | | | X | | | | | |
| CNV1A | Conversion 1 | Single Motor Rotary | | | | | | X | | | X |
| CNV2A | Conversion 2 | Single Motor Rotary | X | | | | | | X | | |
| CNV3A | Conversion 3 | Single Motor Rotary | | X | | | X | | | | |
| CNV4A | Conversion 4 | Single Motor Rotary | | | X | | | | | | X |
| EPU1A | Electric Propulsion Unit 1 | Dual Motor with Gearbox | | | X | | | X | | | |
| EPU1B | Electric Propulsion Unit 1 | Dual Motor with Gearbox | | | X | | | X | | | |
| EPU2A | Electric Propulsion Unit 2 | Dual Motor with Gearbox | | | | X | | | X | | |
| EPU2B | Electric Propulsion Unit 2 | Dual Motor with Gearbox | X | | | | | | X | | |
| EPU3A | Electric Propulsion Unit 3 | Dual Motor with Gearbox | | | X | | | | | | X |
| EPU3B | Electric Propulsion Unit 3 | Dual Motor with Gearbox | | X | | | | | | X | |
| EPU4A | Electric Propulsion Unit 4 | Dual Motor with Gearbox | | | | | X | | | | X |
| EPU4B | Electric Propulsion Unit 4 | Dual Motor with Gearbox | | | | | X | | | | X |
| EPU5A | Electric Propulsion Unit 5 | Dual Motor with Gearbox | | X | | | | | | X | |
| EPU5B | Electric Propulsion Unit 5 | Dual Motor with Gearbox | | | | X | | | | | X |
| EPU6A | Electric Propulsion Unit 6 | Dual Motor with Gearbox | X | | | X | | | | | |
| EPU6B | Electric Propulsion Unit 6 | Dual Motor with Gearbox | | | | | | | X | X | |
| | | Items on Bus: | 8 | 8 | 5 | 6 | 7 | 7 | 6 | 5 | 8 |
| | | Total: | 60 | | | | | | | | |

FIG. 3

| Failure BUS 1 | Failure BUS 2 | Lost Controller 1 | Lost Controller 2 | Lost Controller 3 |
|---|---|---|---|---|
| A1 | B1 | CBP6A | EPU6B | |
| A1 | B2 | RC4A | | |
| A1 | B3 | FC4A | | EPU2B |
| A1 | C1 | CBP2A | CNV2A | |
| A1 | C2 | | | |
| A1 | C3 | FC3A | | EPU3B |
| A2 | B1 | RC1A | | |
| A2 | B2 | CBP3A | CNV3A | |
| A2 | B3 | FC2A | | |
| A2 | C1 | | | |
| A2 | C2 | CBP5A | EPU5A | |
| A2 | C3 | FC1A | | |
| A3 | B1 | | | |
| A3 | B2 | | | |
| A3 | B3 | EPU1A | EPU4B | EPU4A |
| A3 | C1 | | | |
| A3 | C2 | | | |
| A3 | C3 | CBP4A | CNV4A | |
| B1 | C1 | EPU2A | EPU6A | |
| B1 | C2 | RC2A | | |
| B1 | C3 | | | |
| B2 | C1 | RC3A | | |
| B2 | C2 | EPU3A | EPU5B | |
| B2 | C3 | | | |
| B3 | C1 | | | |
| B3 | C2 | CBP1A | CNV1A | EPU1B |
| B3 | C3 | | | |

FIG. 5

CONTROLLER AREA NETWORK DISTRIBUTION SYSTEM FOR AIRCRAFT

CROSS REFERENCE TO RELATED APPLICATIONS

This application claims the benefit of priority of U.S. Provisional Patent Application No. 63/512,685, filed Jul. 10, 2023, the disclosure of which is herein incorporated by reference in its entirety.

BACKGROUND

1. Field

Embodiments of the disclosure relate to flight control systems, and in particular to a flight control system with a controller area network (CAN) distribution system to distribute flight controls such that bandwidth is balanced, bus length and weight are optimized, and safe flight is possible after the failure cases considered.

2. Related Art

Flight control systems are known in the art and generally take into account potential failures. For example, U.S. Pat. No. 7,439,634 to Michalko describes an aircraft system with symmetrical power distribution systems that consider accommodations for failures to continue safe flight. U.S. Pat. No. 7,800,245 to Michalko describes the use of multiple busses, including a ring bus, wherein the ring architecture minimizes wire length and weight for an improved electrical generation and distribution system for an aircraft. U.S. Pat. No. 7,550,866 to Breit et al. describes an aircraft system with multiple loads and with multiple power generation sources located near the multiple loads, such that power can be delivered from the multiple sources to a load so that a failure is mitigated. U.S. Pat. No. 10,079,493 to Winstanley et al. describes an aircraft system with a modular power distribution system having a controller and a power switching network that can detect and overcome faults in power generation. U.S. Pat. No. 10,396,565 to Bailey et al. describes a power distribution system where essential loads and non-essential loads are powered by multiple sources to accommodate potential failures. Lastly, International Patent Publication No. WO 2019/232472 A1 to Bevirt et al. describes an aircraft control system that utilizes power redundancy for mitigating failures during operation of the aircraft.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In embodiments, the disclosure relates to a controller area network (CAN) distribution system for an aircraft. The system comprising one or more flight control computers for receiving and transmitting commands for operation of the aircraft; a first bus bundle; a second bus bundle, and a third bus bundle. The first bus bundle is in communication with at least one of the flight control computers and directs communication from the at least one flight control computer to a left front rotor assembly and a right rear rotor assembly. The second bus bundle is in communication with at least one of the flight control computers and directs communication from the at least one flight control computer to a right front rotor assembly and a left rear rotor assembly. The third bus bundle is in communication with at least one of the flight control computers and directs communication from the at least one flight control computer to a left wing tip rotor assembly and a right wing tip rotor assembly. The first bus bundle, the second bus bundle, and the third bus bundle are configured to balance bandwidth, optimize total bus length and width, and provide adequate control after a failure of any two busses.

According to another embodiment, the disclosure relates to a controller area network (CAN) distribution system for an aircraft having six rotor assemblies, wherein each rotor assembly has a dual motor configuration. The system includes three flight control computers for receiving and transmitting commands for operation of the aircraft; a first bus bundle; a second bus bundle; and a third bus bundle. The first bus bundle is in communication with the three flight control computers and includes a first bus, a second bus, and a third bus. The first bus bundle is communicatively linked to a left front rotor assembly and a right rear rotor assembly such that each motor of the left front rotor assembly and the right rear rotor assembly is in communication with at least two busses of the first bus, the second bus, and the third bus of the first bus bundle and further is in communication with the three flight control computers. The second bus bundle is in communication with the three flight control computers and includes a first bus, a second bus, and a third bus. The second bus bundle is communicatively linked to a right front rotor assembly and a left rear rotor assembly such that each motor of the right front rotor assembly and the left rear rotor assembly is in communication with at least two busses of the first bus, the second bus, and the third bus of the second bus bundle and is further in communication with the three flight control computers. The third bus bundle is in communication with the three flight control computers and includes a first bus, a second bus, and a third bus. The third bus bundle is communicatively linked to a left wing tip rotor assembly and a right wing tip rotor assembly, such that each motor of the left wing tip rotor assembly and the right wing tip rotor assembly is in communication with at least two busses of the first bus, the second bus, and the third bus of the third bus bundle and is further in communication with the three flight control computers. The first bus bundle, the second bus bundle, and the third bus bundle are configured to balance bandwidth, optimize total bus length and width, and provide adequate control after a failure of any two busses.

BRIEF DESCRIPTION OF THE DRAWING FIGURES

Embodiments of the invention are described in detail below with reference to the attached drawing figures, wherein:

FIG. 3 is a table showing specified aircraft components linked to specific busses for each bus bundle as part of the CAN distribution system associated with the aircraft control system architecture of FIG. 1.

Figure 1:
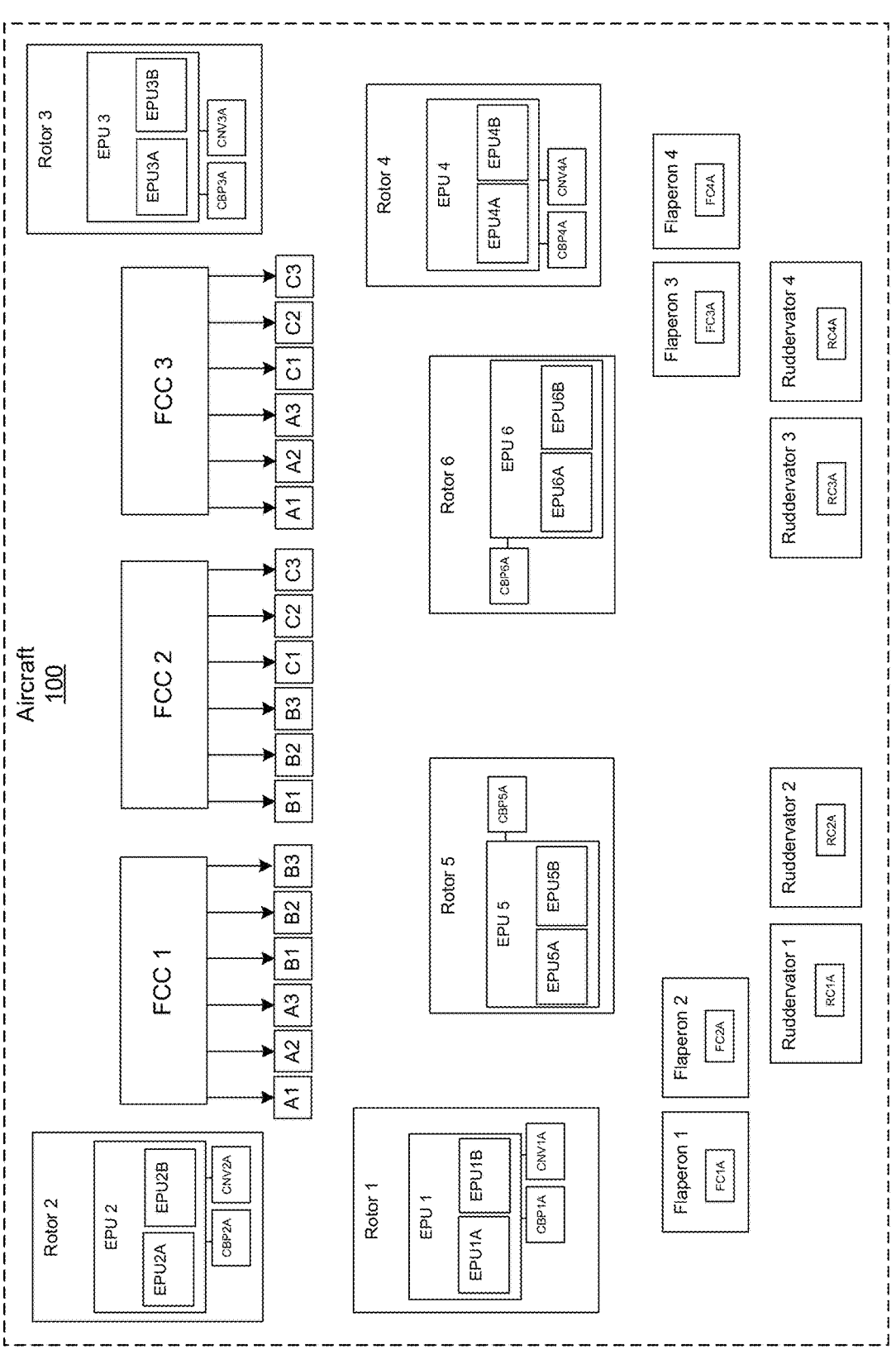
FIG. 1 is a diagram of an aircraft control system architecture as part of a CAN distribution system of the present invention.
Figure 4A:
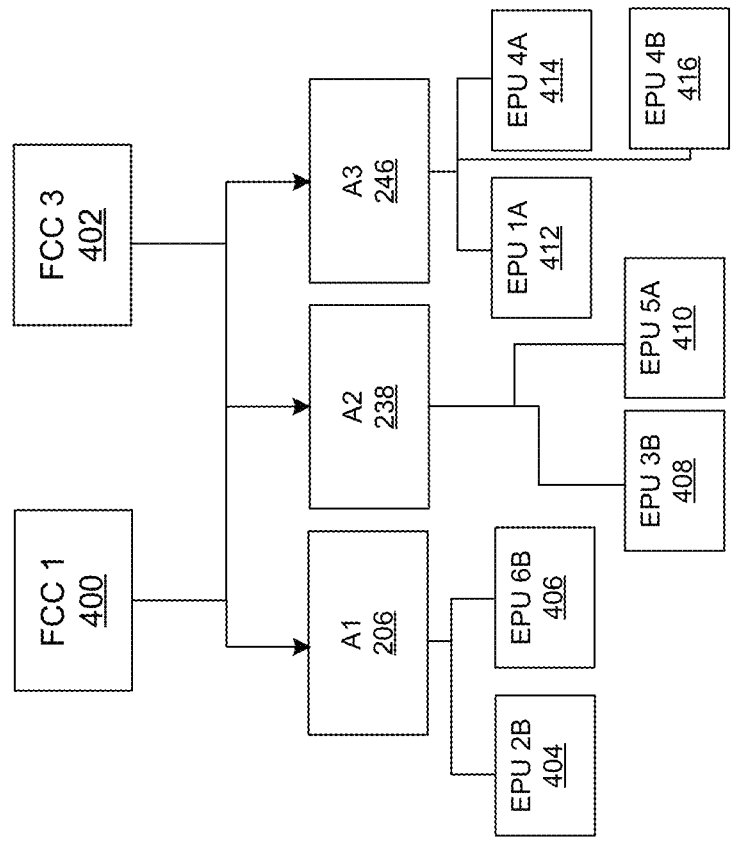
Figure 4B:
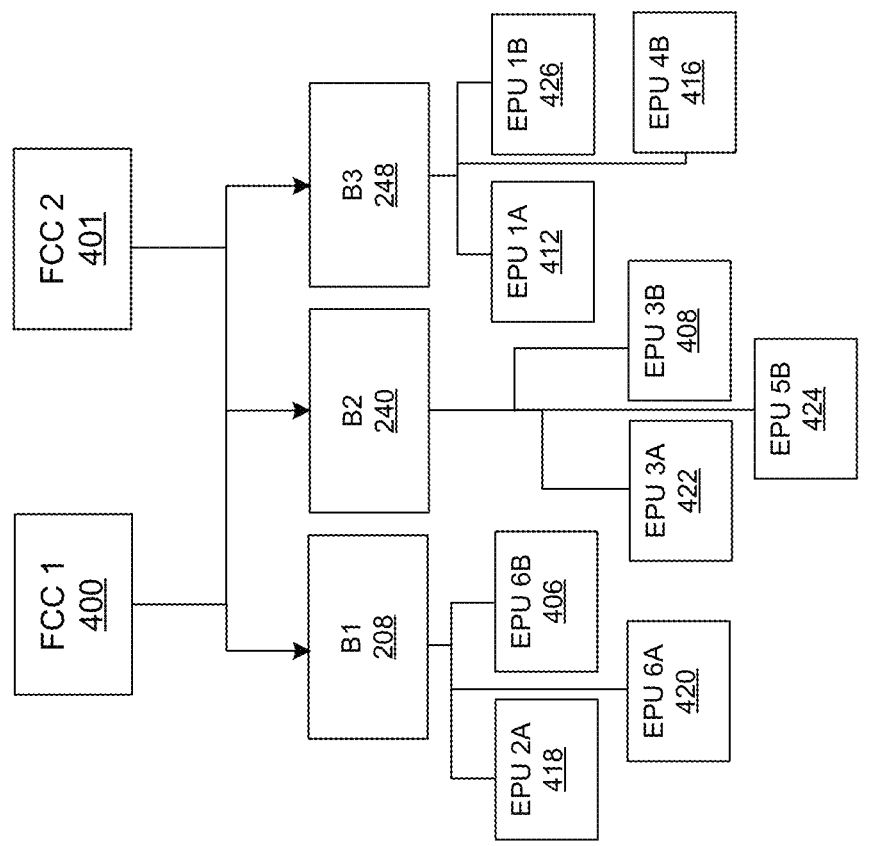
Figure 4C:
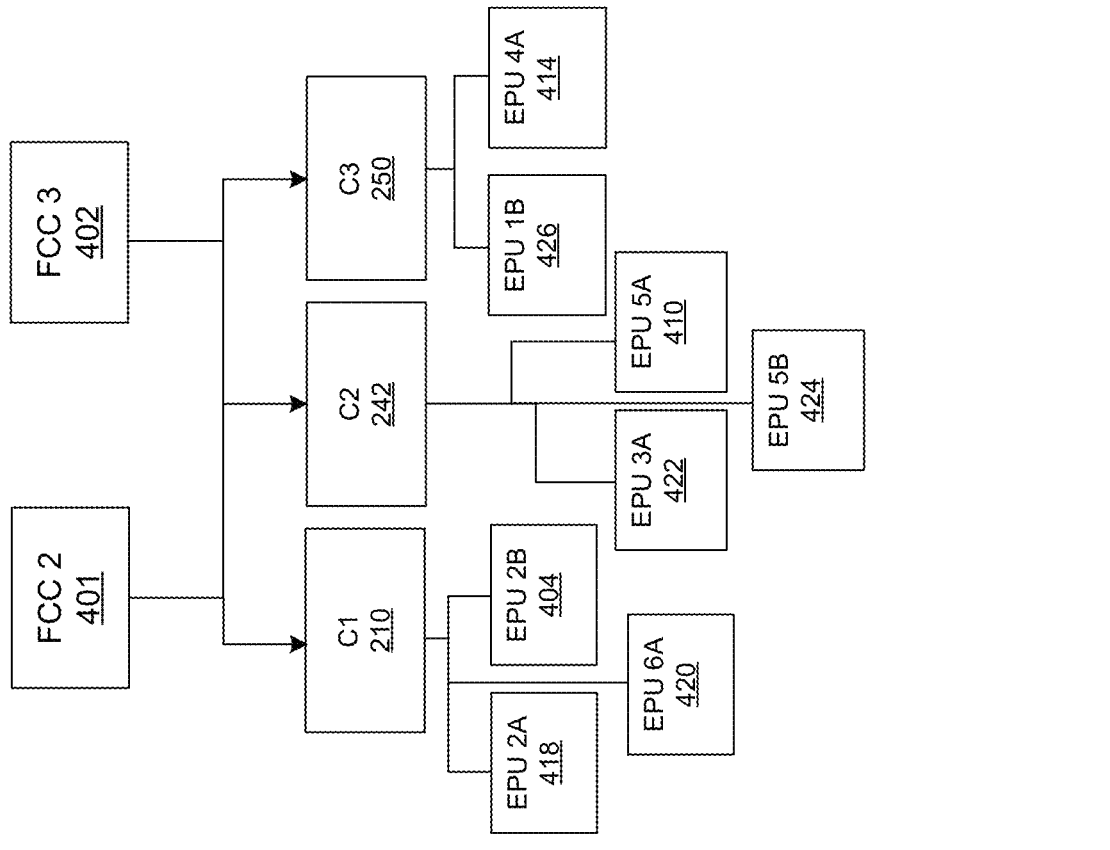

FIGS. 4A, 4B, and 4C are diagrams showing CAN distribution from three flight control computers (FCCs) of FIG. 1 to the twelve electric propulsion unit (EPU) controllers of FIG. 1.

FIG. 5 is a table showing the possible two bus failure combinations as part of the CAN distribution system and resulting controller losses associated with aircraft components.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft utilize electrical distribution systems to distribute power and communication between aircraft electrical components. Specifically, aircraft include a control system architecture with busses to facilitate communication from one or more flight control computers (FCCs) to controllers of effectors, including rotor assemblies and flight control surfaces (e.g., flaperons and ruddervators), for implementation of user or computer-generated commands to operate the aircraft. Aircraft control components, including motors, effectors, controllers, computers, busses, etc. can individually, or in combination, experience failures. Such failures can result in devastating conditions during flight, and accordingly, it is necessary for the aircraft manufacturers to implement flight controls through a control system architecture such that minimum acceptable control (MAC) is maintained in as many conditions as possible so that the aircraft may be safely operated and/or landed.

The present invention provides for an improvement to a control system architecture of an aircraft by providing a controller area network (CAN) distribution system with three bus bundles for communicating with controllers of aircraft components (i.e. effectors), including collectives, conversions, electric propulsion units (EPUs), and flight control surfaces, in a configuration that aids in balancing bandwidth, optimizing total bus length and weight, and allowing for continued safe flight and landing after a loss of any two busses. Specifically, the present invention includes three bus bundles in a specific and unique arrangement, wherein the arrangement allows for continued control in a plurality of failure conditions during both forward flight and vertical takeoff and landing (VTOL) operations.

FIG. 1 depicts a block diagram of an aircraft control system architecture as part of a CAN distribution system of an aircraft 100. In embodiments, the aircraft 100 is a six rotor assembly aircraft, represented by Rotors 1 through 6, each having a dual motor with gearbox configuration. In other words, each rotor assembly has an EPU (EPUs 1-6), each with dual motors having associated controllers, for example controllers EPU1A and EPU1B as associated with EPU 1. Although the aircraft may vary, in at least some embodiments, the aircraft includes a left wing tip rotor assembly (Rotor 1), a left front rotor assembly (Rotor 2), a right front rotor assembly (Rotor 3), a right wing tip rotor assembly (Rotor 4), a left rear rotor assembly (Rotor 5), and a right rear rotor assembly (Rotor 6). These designations with associated numbering will be used throughout the present disclosure.

Each rotor assembly further utilizes a single motor and single loadpath collective linear actuator (COL) with associated controllers (CBP1A, CBP2A, CBP3A, CBP4A, CBP5A, CBP6A). The front rotor assemblies (Rotors 2 and 3) and the wing tip rotor assemblies (Rotors 1 and 4) also each include a single motor and single loadpath conversion rotary actuator (CNV) with associated controllers (CNV1A, CNV2A, CNV3A, CNV4A). The COL of its associated rotor assembly is used to adjust a propeller blade angle of its respective rotor; and the CNV is used to convert the orientation of its respective rotor from upright to forward facing for switching between VTOL and forward flight.

Aircraft 100, in embodiments, includes left and right trailing edge flaperons (Flaperons 1-4), each having an associated controller (FC1A, FC2A, FC3A, FC4A), and left and right ruddervators (Ruddervators 1-4), each having an associated controller (RC1A, RC2A, RC3A, RC4A). Flaperons are control surfaces on the wings configured to combine the function of traditional flaps and ailerons; and ruddervators are control surfaces configured to combine the function of a traditional rudders and elevators.

In the preferred embodiment, the aircraft 100 includes three FCCs (FCCs 1-3), each providing communication through a plurality of CAN busses to the controllers discussed above. Each controller connects to at least two busses, thereby providing redundancy for improved safe flight after a failure. The CAN distribution system of the present invention includes three bus bundles, specifically, a first bundle including busses A1, B1, C1, a second bundle including busses A2, B2, C2, and a third bundle including busses A3, B3, C3. As shown, each bus is in communication with two FCCs. Specifically, FCC 1 utilizes A1, A2, A3, B1, B2, B3 for transmission of commands to various aircraft components; FCC 2 utilizes B1, B2, B3, C1, C2, C3 for transmission of commands to various aircraft components;

and FCC 3 utilizes A1, A2, A3, C1, C2, C3 for transmission of commands to various aircraft components.

The CAN distribution system is implemented in an aircraft 100 represented by the dashed exterior rectangle. Those skilled in the art will appreciate that the aircraft 100 may vary in style, model, and operational components. The plurality of FCCs provide for operation of the aircraft 100 through any number and combination of interfaces, hardware, and software components. Having more than one FCC provides redundancy to account for potential FCC failures or malfunctions. For example, in some embodiments, having three FCCs, a voting algorithm may be employed to vote out a single FCC that malfunctions or produces faulty data. In the present invention, each bus is connected to two FCCs to provide redundancy, and each effector is connected to multiple busses in an arrangement such that each effector can receive a command from each FCC.

Figure 2A:
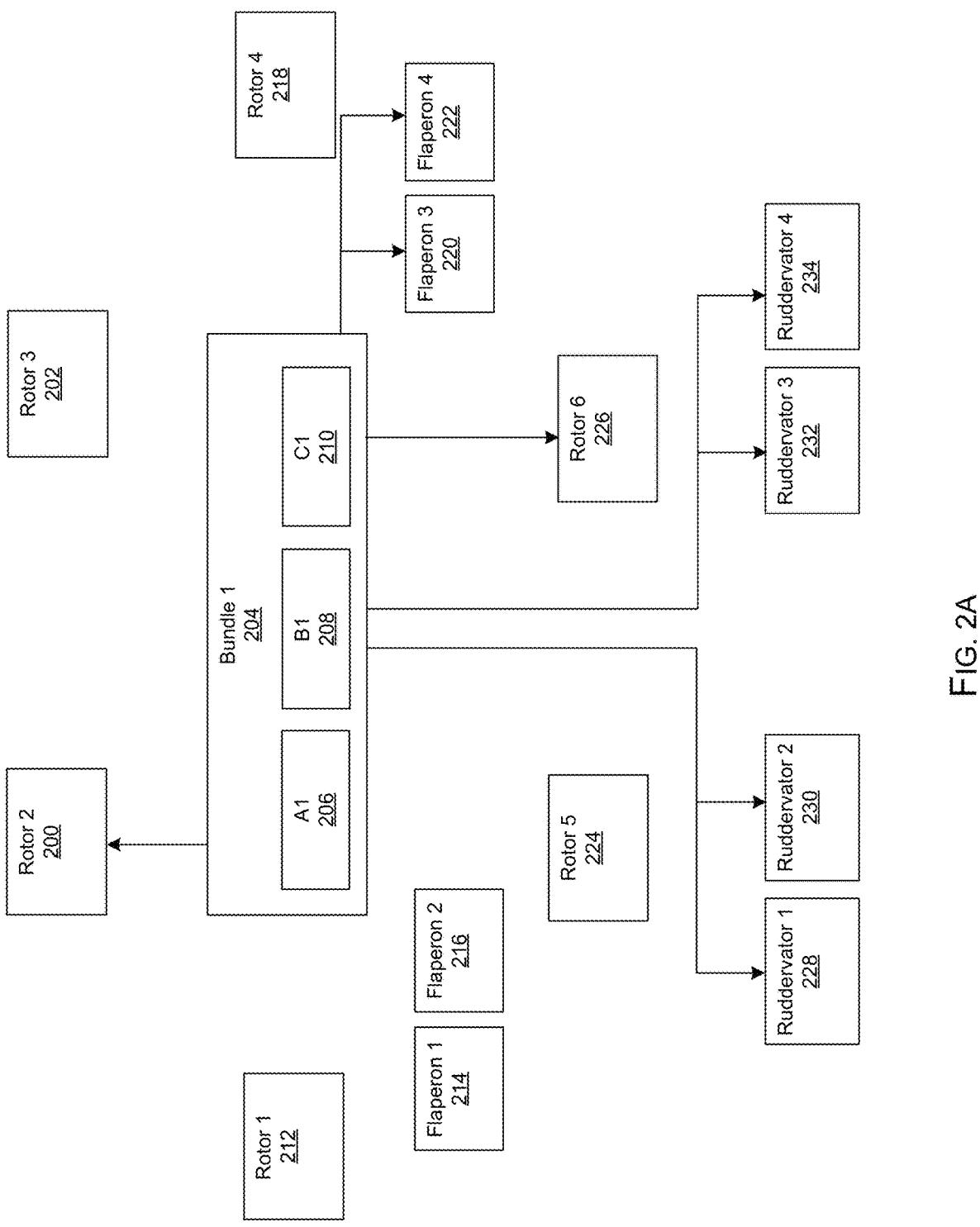
FIG. 2A is a first diagram showing communicative linking of a first bus bundle to aircraft components as part of the CAN distribution system of FIG. 1.
Figure 2B:
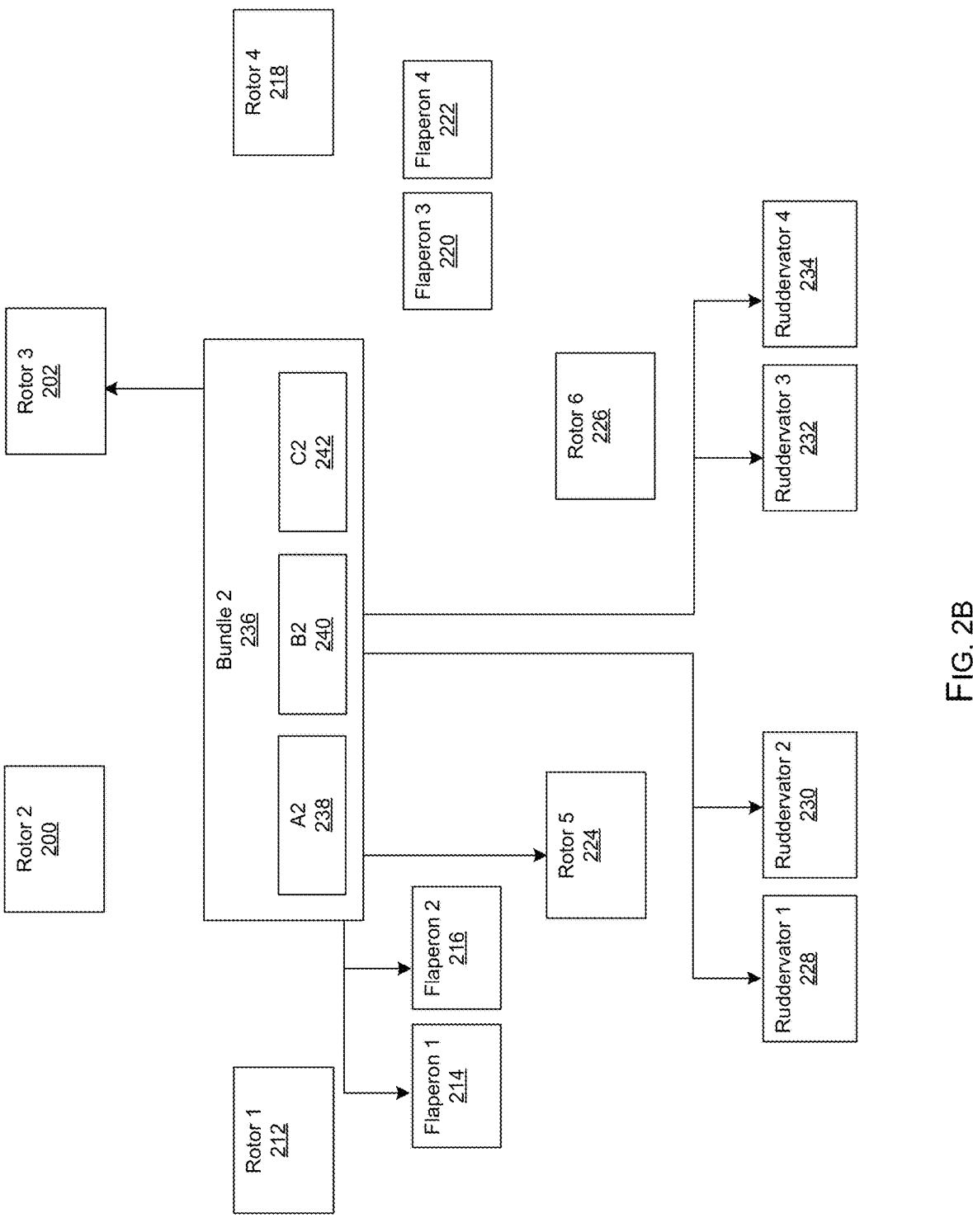
FIG. 2B is a second diagram showing communicative linking of a second bus bundle to aircraft components as part of the CAN distribution system of FIG. 1.
Figure 2C:
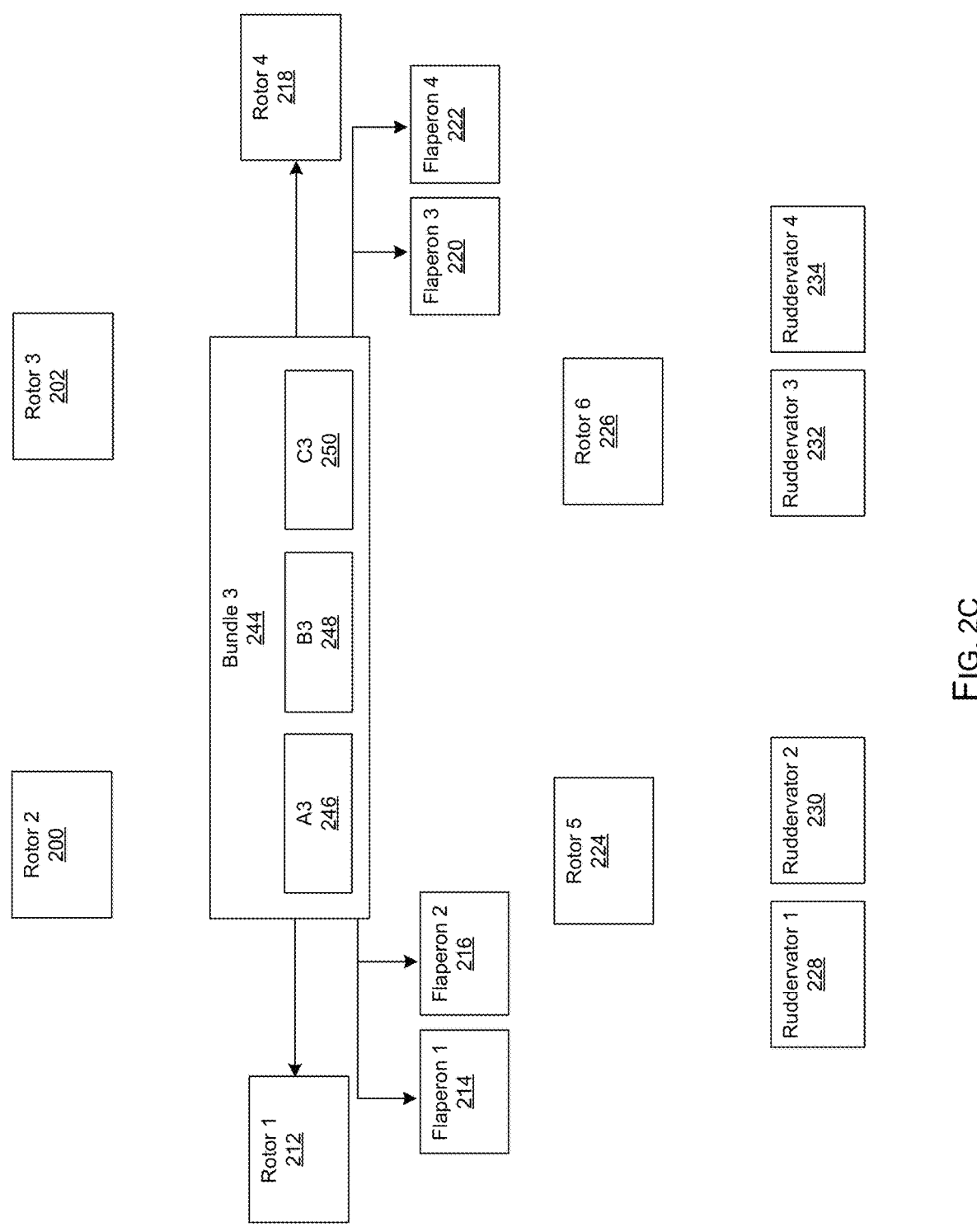
FIG. 2C is a third diagram showing communicative linking of a third bus bundle to aircraft components as part of the CAN distribution system of FIG. 1.

In FIGS. 2A, 2B, and 2C, simplified diagrams depict communicative links for each bus bundle. Turning to FIG. 2A, the first bus bundle 204, including a first bus 206, a second bus 208, and a third bus 210 is communicatively linked to the left front rotor assembly 200 and the right rear rotor assembly 226. In addition, the first bus bundle 204 is communicatively linked to each of the four ruddervators 228, 230, 232, 234 as well as two flaperons 220, 222, specifically the right side flaperons 220, 222. Turning to FIG. 2B, the second bus bundle 236 also includes a first bus 238, a second bus 240, and a third bus 242. This bundle 236 is communicatively linked to the right front rotor assembly 202, the left rear rotor assembly 224, the four ruddervators 228, 230, 232, 234, and two flaperons 214, 216, specifically the left flaperons 214, 216. Turning to FIG. 2C, the third bus bundle 244 with a first bus 246, second bus 248, and third bus 250 is communicatively linked to the left and right wing tip rotor assemblies 212, 218. In addition, the third bus bundle 244 is in communication with the four flaperons 214, 216, 220, 222. Those skilled in the art will understand that the connection between each associated bus to an associated aircraft component is through a controller of said associated aircraft component, thereby allowing for communication and operation through the controller.

The preferred embodiment includes a specified arrangement as shown in the table of FIG. 3. The table of FIG. 3 identifies which controller (first column) is specifically linked to which bus (A1, A2, A3, B1, B2, B3, C1, C2, C3) and in turn to which FCC (FCC 1, 2, 3) through each bus connection. Each controller is tied to two busses such that if one fails, the second bus ensures the controller can still receive commands from one or more FCCs over the remaining bus. For example, controller EPU1A, for a first motor of the EPU of the first rotor assembly 212, is tied to busses A3 and B3, which in turn couples the controller EPU1A to FCCS 1, 2, and 3. Accordingly, should either bus A3 or B3 fail, the alternate bus can be used to operate controller EPU1A. FIG. 3 further reiterates that FCC 1 and FCC 3 use busses A1, A2, A3; FCC 1 and FCC 2 use busses B1, B2, B3; and FCC 2 and FCC 3 use busses C1, C2, C3.

In FIGS. 4A, 4B, and 4C, diagrams depict the CAN bus distribution to the twelve motor controllers for each motor of the six rotor assemblies. These diagrams depict redundancy such that each controller is communicatively linked to at least two busses and further to all three FCCs. Specifically, as shown in FIG. 4A, the first and third FCCs 400, 402 are connected to the first three busses 206, 238, 246 of the three bus bundles. The first bus 206 of the first bus bundle 204 is communicatively linked to controllers 404, 406 of the left front rotor assembly and the right rear rotor assembly. The first bus 238 of the second bus bundle 236 is communicatively linked to controllers 408, 410 of the right front rotor assembly and left rear rotor assembly. Finally, the first bus 426 of the third bus bundle 244 is communicatively linked to controllers 412, 414, 416 of the left wing tip rotor assembly and the right wing tip rotor assembly. Accordingly, the first and third flight control computers 400, 402 are therefore in communication with of all of the foregoing controllers of FIG. 4A.

Turning to FIG. 4B, the first and second FCCs 400, 401 provide operations through the second busses 208, 240, 248 of each bus bundle. Specifically, the second bus 208 of the first bus bundle 204 is communicatively linked to controllers 418, 406, 420 of the left front rotor assembly and the right rear rotor assembly. The second bus 240 of the second bus bundle 236 is communicatively linked to controllers 422, 408, 424 of the right front rotor assembly and the left rear rotor assembly. Finally, the second bus 248 of the third bus bundle 244 is communicatively linked to controllers 412, 426, 416 of the left and right wing tip rotor assemblies. Accordingly, the first and second FCCs 400, 401 provide operation of each controller above and shown in FIG. 4B.

Turning to FIG. 4C, the second and third FCCs 401, 402 provide flight operations through the third busses 210, 242, 250 of each bus bundle. Specifically, the third bus 210 of the first bus bundle 204 is communicatively linked to controllers 418, 404, 420 of the left front rotor assembly and the right rear rotor assembly. The third bus 242 of the second bus bundle 236 is communicatively linked to controllers 422, 410, 424 of the right front rotor assembly and the left rear rotor assembly. Finally, the third bus 250 of the third bus bundle 244 is communicatively linked to controllers 426, 414 of the left and right wing tip rotor assemblies.

In summary, each controller can receive commands from all three FCCs through two busses. The specified arrangement and architecture of the CAN distribution provides for balanced bandwidth, optimization of total bus length and weight, and the ability to continue safe flight and landing after a loss of two CAN busses.

In FIG. 5, another table depicts possible combinations of pairs of busses that can fail in the flight control system. Each row demonstrates the associated lost controllers for each pair. For each of these rows, because of the CAN distribution system discussed herein, MAC is able to be maintained. Accordingly, any two busses of the present architecture can fail, with MAC maintained. For example, as shown, if bus A1 and bus B1 are both lost, then controllers CBP6A and EPU6B are lost. The remaining busses allow the FCCs to utilize every controller with the exception of CP6A and EPU 6B to continue safe flight and landing. Because each controller is connected to two busses, at a minimum, two busses must fail before a controller is lost. And further, the system is architected in a way such that no single failure results in falling below MAC and the probability of failures that could result in the vehicle falling below MAC is reduced.

The specific architecture is configured to accommodate for a loss of any two CAN busses without falling below MAC. This is due to the specific arrangement of CAN busses as discussed above. The arrangement separates control surface failures from rotor failures such that it is unlikely for a control surface (ruddervators and flaperons) to fail at the same time as a rotor. In addition, the effectors are grouped such that after loss of any two CAN busses, the aircraft can continue flight in hover mode or in airplane mode, and accordingly, in embodiments wherein the aircraft is required to land in hover mode, such ability remains after loss of any two CAN busses.

The CAN distribution system provides for allowed and disallowed combinations. The allowed combinations have a higher probability of occurring than the disallowed combinations. Specifically, some contemplated allowed combinations are: (1) loss of two center-of-gravity (C.G.) opposed rotors; (2) degradation of three rotors if two of the three are C.G. opposed; (3) loss of one flaperon; and (4) loss of one ruddervator. The CAN bus system is implemented such that the results of single failures stay within the allowed combinations and MAC is maintained.

Alternatively, some contemplated disallowed combinations are (1) loss of three motors across the second and third rotor assemblies; (2) loss of three motors across the fifth and sixth rotor assemblies; (3) loss of the collective motor/single load path collective linear actuator (COL) on any two non C.G. opposed rotor assemblies; and (4) loss of two rotor assemblies (both motors and COL) across the first, second, third, and fourth rotor assemblies. The disallowed combinations are unlikely to occur due to the architecture of the present invention. The present invention accounts for loss of any two busses without resulting in a disallowed combination. In addition, those skilled in the art will appreciate that no single component failure results in a disallowed combination. For example, for the first disallowed combination, namely loss of three motors across the second and third rotor assemblies, would require a loss of a minimum of 5 busses, and accordingly, is unlikely to occur. The architecture of the present invention ensures that the most likely failure scenarios are accounted for such that predefined flight controls are implemented to maintain MAC.

Further, the CAN distribution system, along with the plurality of FCCS, is configured for the effects of flight control failures. In the event of a loss of control of a collective linear actuator, the collective is held in position and the associated rotor is disabled if the flight mode changes. In the event of a loss of one rotor, the thrust from the C.G. opposed rotor would be reduced. In the event of a loss of a conversion: (1) if the aircraft is in forward flight, the associated rotor and C.G. opposed rotor are lost for landing; and (2) the aircraft would only land in hover mode, but can perform a rolling landing in hover mode if needed.

Although the invention has been described with reference to the embodiments illustrated in the attached drawing figures, it is noted that equivalents may be employed and substitutions made herein without departing from the scope of the invention as recited in the claims.

The invention claimed is:

1. A controller area network distribution system for an aircraft having three pairs of rotor assemblies, comprising:
   one or more flight control computers for receiving and transmitting commands for operation of the aircraft;
   a first bus bundle in communication with at least one of the flight control computers, the first bus bundle directs communication from the at least one flight control computer to a first pair of rotor assemblies;
   a second bus bundle in communication with at least one of the flight control computers, the second bus bundle directs communication from the at least one flight control computer to a second pair of rotor assemblies; and
   a third bus bundle in communication with at least one of the flight control computers, the third bus bundle directs communication from the at least one flight control computer to a third pair of rotor assemblies;
   wherein the first bus bundle, the second bus bundle, and the third bus bundle are configured to balance bandwidth, optimize total bus length and width, and provide adequate control after a failure of any two busses.

2. The system of claim 1, wherein the first pair of rotor assemblies comprises a left front rotor assembly and a right rear rotor assembly; the second pair of rotor assemblies comprises a right front rotor assembly and a left rear rotor assembly; and the third pair of rotor assemblies comprises a left wing tip rotor assembly and a right wing tip rotor assembly.

3. The system of claim 2, wherein the first bus bundle further comprises:
   a first bus communicatively linked to a first motor of the left front rotor assembly and a first motor of the right rear rotor assembly;
   a second bus communicatively linked to a second motor of the left front rotor assembly, the first motor of the right rear rotor assembly, and a second motor of the right rear rotor assembly; and
   a third bus communicatively linked to the first motor of the left front rotor assembly, the second motor of the left front rotor assembly, and the second motor of the right rear rotor assembly.

4. The system of claim 3, wherein the first bus bundle further comprises:
   the first bus directing communication to a collective linear actuator of the left front rotor assembly, a conversion rotary actuator of the left front rotor assembly, and a collective linear actuator of the right rear rotor assembly;
   the second bus directing communication to the collective linear actuator of the right rear rotor assembly; and
   the third bus directing communication to the collective linear actuator of the left front rotor assembly and the conversion rotary actuator of the left front rotor assembly.

5. The system of claim 3, wherein the first bus bundle further comprises:
   the first bus directing communication to a first ruddervator, a first flaperon, and a second flaperon;
   the second bus directing communication to a second ruddervator and a third ruddervator; and
   the third bus directing communication to fourth ruddervator.

6. The system of claim 2, wherein the second bus bundle further comprises:
   a first bus directing communication to a first motor of the right front rotor assembly and a first motor of the left rear rotor assembly;
   a second bus directing communication to the first motor of the right front rotor assembly, a second motor of the right front rotor assembly, and a second motor of the left rear rotor assembly; and
   a third bus directing communication to the second motor of the right front rotor assembly, the first motor of the left rear rotor assembly, and the second motor of the left rear rotor assembly.

7. The system of claim 6, wherein the second bus bundle further comprises:
   the first bus directing communication to a collective linear actuator of the right front rotor assembly, a conversion rotary actuator of the right front rotor assembly, and a collective linear actuator of the left rear rotor assembly;
   the second bus directing communication to the collective linear actuator of the right front rotor assembly and the conversion rotary actuator of the right front rotor assembly; and the third bus directing communication to the collective linear actuator of the left rear rotor assembly.

8. The system of claim 6, wherein the second bus bundle further comprises:

the first bus directing communication to a first ruddervator, a first flaperon, and a second flaperon;

the second bus directing communication to a second ruddervator and a third ruddervator; and the third bus directing communication to a fourth ruddervator.

9. The system of claim 2, wherein the third bus bundle further comprises:

a first bus directing communication to a first motor of the left wing tip rotor assembly, a first motor of the right wing tip rotor assembly, and a second motor of the right wing tip rotor assembly;

a second bus directing communication to the first motor of the left wing tip rotor assembly, a second motor of the left wing tip rotor assembly, and the second motor of the right wing tip rotor assembly; and a third bus directing communication to the second motor of the left wing tip rotor assembly and the first motor of the right wing tip rotor assembly.

10. The system of claim 9, wherein the third bus bundle further comprises:

the first bus directing communication to a collective linear actuator of the right wing tip rotor assembly, and a conversion rotary actuator of the right wing tip rotor assembly;

the second bus directing communication to a collective linear actuator of the left wing tip rotor assembly and a conversion rotary actuator of the left wing tip rotor assembly; and the third bus directing communication to the collective linear actuator of the left wing tip rotor assembly, the collective linear actuator of the right wing tip rotor assembly, the conversion rotary actuator of the right wing tip rotor assembly, and the conversion rotary actuator of the left wing tip rotor assembly.

11. The system of claim 9, wherein the third bus bundle further comprises:

the second bus directing communication to a first flaperon and a second flaperon; and the third bus directing communication to a third flaperon and a fourth flaperon.

12. The system of claim 1, wherein each of the first bus bundle, the second bus bundle, and the third bus bundle further comprise three busses each.

13. The system of claim 1, wherein the plurality of flight control computers comprises three flight control computers and wherein each bus of each of the first, second, and third bus bundles is in communication with at least two flight control computers.

14. The system of claim 1, wherein each rotor assembly includes a first motor and a second motor and wherein each motor is communicatively linked to at least two busses of an associated one of the first bus bundle, the second bus bundle, and the third bus bundle.

15. The system of claim 1, wherein each rotor assembly includes a first motor and a second motor and wherein each motor is communicatively linked to at least two flight control computers.

16. The system of claim 1, wherein each rotor assembly includes a first motor and a second motor and wherein each motor is communicatively linked to at least three flight control computers.

17. A controller area network distribution system for an aircraft having six rotor assemblies, each rotor assembly having a dual motor configuration, the system comprising:

three flight control computers for receiving and transmitting commands for operation of the aircraft;

a first bus bundle in communication with the three flight control computers, the first bus bundle having a first bus, a second bus, and a third bus, the first bus bundle communicatively linked to a left front rotor assembly and a right rear rotor assembly such that each motor of the left front rotor assembly and the right rear rotor assembly is in communication with at least two busses of the first bus, the second bus, and the third bus of the first bus bundle and further in communication with the three flight control computers;

a second bus bundle in communication with the three flight control computers, the second bus bundle having a first bus, a second bus, and a third bus, the second bus bundle communicatively linked to a right front rotor assembly and a left rear rotor assembly such that each motor of the right front rotor assembly and the left rear rotor assembly is in communication with at least two busses of the first bus, the second bus, and the third bus of the second bus bundle and further in communication with the three flight control computers; and a third bus bundle in communication with the three flight control computers, the third bus bundle having a first bus, a second bus, and a third bus, the third bus bundle communicatively linked to a left wing tip rotor assembly and a right wing tip rotor assembly, such that each motor of the left wing tip rotor assembly and the right wing tip rotor assembly is in communication with at least two busses of the first bus, the second bus, and the third bus of the third bus bundle and further in communication with the three flight control computers;

wherein the first bus bundle, the second bus bundle, and the third bus bundle are configured to balance bandwidth, optimize total bus length and width, and provide adequate control after a failure of any two busses.

18. The system of claim 17, wherein the three flight control computers, the first bus bundle, the second bus bundle, and the third bus bundle are configured to accommodate for a loss of a collective linear actuator of any of the six rotor assemblies by holding the collective linear actuator in a pre-set position and disabling an associated rotor of the collective linear actuator if a flight mode changes.

19. The system of claim 17, wherein the three flight control computers, the first bus bundle, the second bus bundle, and the third bus bundle are configured to accommodate for a loss of a failed rotor assembly by reducing thrust from a center of gravity opposed rotor assembly.

20. The system of claim 17, wherein the three flight control computers, the first bus bundle, the second bus bundle, and the third bus bundle are configured to accommodate for a loss of a conversion rotary actuator of any of the six rotor assemblies by first determining if the aircraft is in forward flight, and in an event of the aircraft being in forward flight, an associated rotor assembly of the conversion rotary actuator and a center of gravity opposed rotor assembly are disabled for landing and second, by only providing operation of the rotor assemblies to land in a hover mode of the aircraft.

\* \* \* \* \*